Aug. 17, 1926.
N. CLINCOSTRAM
AID TO DRIVING AN AUTOMOBILE
Filed June 7, 1926
1,595,996
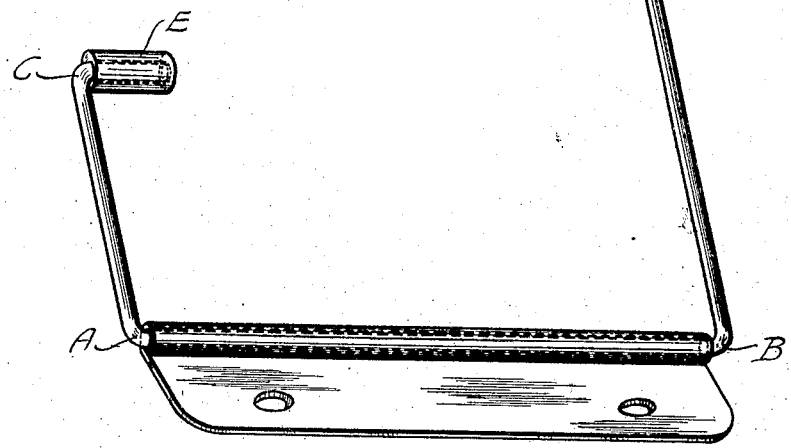
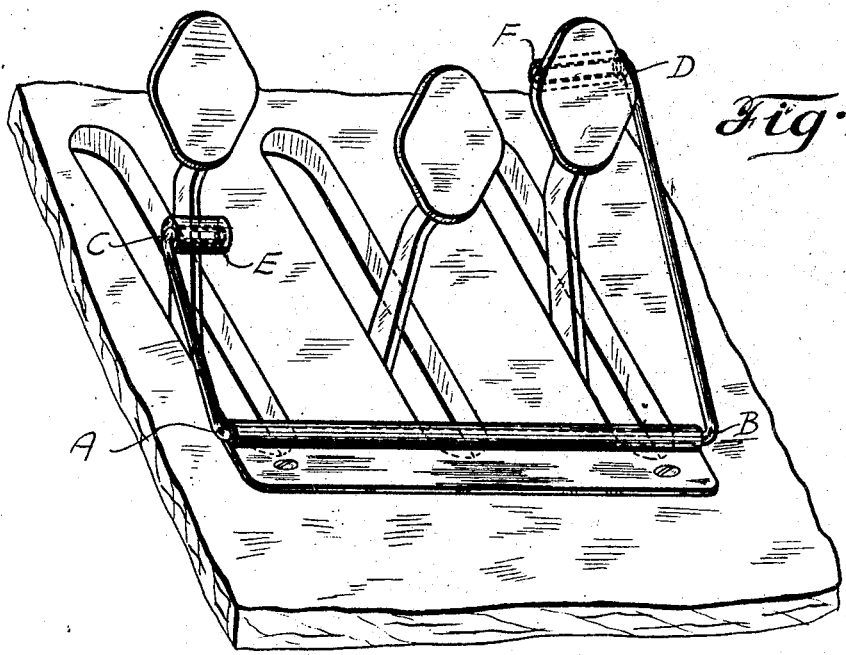
INVENTOR Patented Aug. 17, 1926.

1,595,996

UNITED STATES PATENT OFFICE.

NICHOLAS CLINCOSTRAM, OF ST. LOUIS, MISSOURI.

AID TO DRIVING AN AUTOMOBILE.

Application filed June 7, 1926. Serial No. 114,236.

My invention relates to an improvement in operating the foot controls of an automobile. My object is to facilitate their operation. This I attain by mechanically coordinating action of the brake and clutch controls as follows, reference being had to the accompanying drawing, in which—

Figure 1 shows the device detached and Figure 2 shows it in installed position. Similar letters refer to similar parts in the two views. AB is a cross-rod hinged to the floor in rear of the foot controls and running parallel with their axes. It is right angled at points A and B, the extensions AC and BD forming levers with respect to the cross member AB. These levers bear on the clutch and brake controls by means of the contact rollers E and F. The lever AC acts on the clutch control lever and is proportioned as to length so that carried forward it will not carry the clutch lever beyond its neutral traverse. The lever BD is so proportioned and placed that the contact roller bears underneath the foot plate of the brake control lever and is carried with it when applying the brake, effecting automatic release of the clutch through the cross member AB and the opposite lever AC. In pushing the clutch lever forward to engage the low speed the device is not functioning. The clutch lever is free from linkage or attachment, and there is no adjustment requiring attention once the device is properly installed.

I claim:

In a device for aid to driving an automobile, the combination of a cross-member hinged to the floor in rear of and parallel with the pedal controls axes; levers on the said cross-member contacting with the clutch and brake levers, respectively, one of the levers being positioned in front of the brake control lever, and the other lever being positioned in rear of the clutch control lever; contact rollers mounted on said levers, all substantially as set forth.

NICHOLAS CLINCOSTRAM.